United States Patent [19]

Collet

[11] Patent Number: 4,474,031

[45] Date of Patent: Oct. 2, 1984

[54] HEATPUMP

[75] Inventor: Peter J. Collet, Apeldoorn, Netherlands

[73] Assignee: Nederlandse Centrale Organisatie Voor Toegepast-Natuurwetenschappelijk Onderzoek, The Hague, Netherlands

[21] Appl. No.: 470,524

[22] Filed: Feb. 28, 1983

[30] Foreign Application Priority Data

Mar. 5, 1982 [NL] Netherlands .......................... 8200922

[51] Int. Cl.³ .............................................. B01D 9/04
[52] U.S. Cl. ..................... 62/324.2; 62/536; 62/540; 62/541; 62/544; 62/324.3
[58] Field of Search ................ 62/123, 124, 324, 238, 62/532, 536, 540, 541, 544, 40, 324.1, 324.2, 324.3; 203/DIG. 4

[56] References Cited

U.S. PATENT DOCUMENTS 3,443,393 5/1969 Goldberg ............................ 62/124
3,535,210 10/1970 Linde ............................ 203/DIG. 4
4,003,213 1/1977 Cox ....................................... 62/124
4,044,568 8/1977 Hagen ................................... 62/124

FOREIGN PATENT DOCUMENTS 0015157 9/1980 European Pat. Off. .
2649872 11/1978 Fed. Rep. of Germany .
0042795 12/1981 France .

OTHER PUBLICATIONS

Article entitled "The Icehouse Cometh", *Mechanical Engineering*, vol. 99, No. 4, Apr. 1977, p. 71.

*Primary Examiner*—Frank Sever
*Attorney, Agent, or Firm*—Brumbaugh, Graves, Donohue & Raymond

[57] ABSTRACT

A system for extracting heat from low temperature water includes a source of water at a temperature between approximately 0° C. and 10° C. and a heat pump removing heat from the water and transporting it for transfer to an external heating circuit. The heat pump has a closed circuit containing a heat transport fluid, a condenser, and an evaporator. The water, acting as a heat source, is fed into a vacuum vessel and subjected to triple-point conditions thereby concomitantly forming water vapor and a water/ice crystal suspension. The evaporator is disposed in the vacuum vessel out of direct contact with the water/ice crystal suspension for absorbing heat from the evaporated water vapor.

7 Claims, 1 Drawing Figure

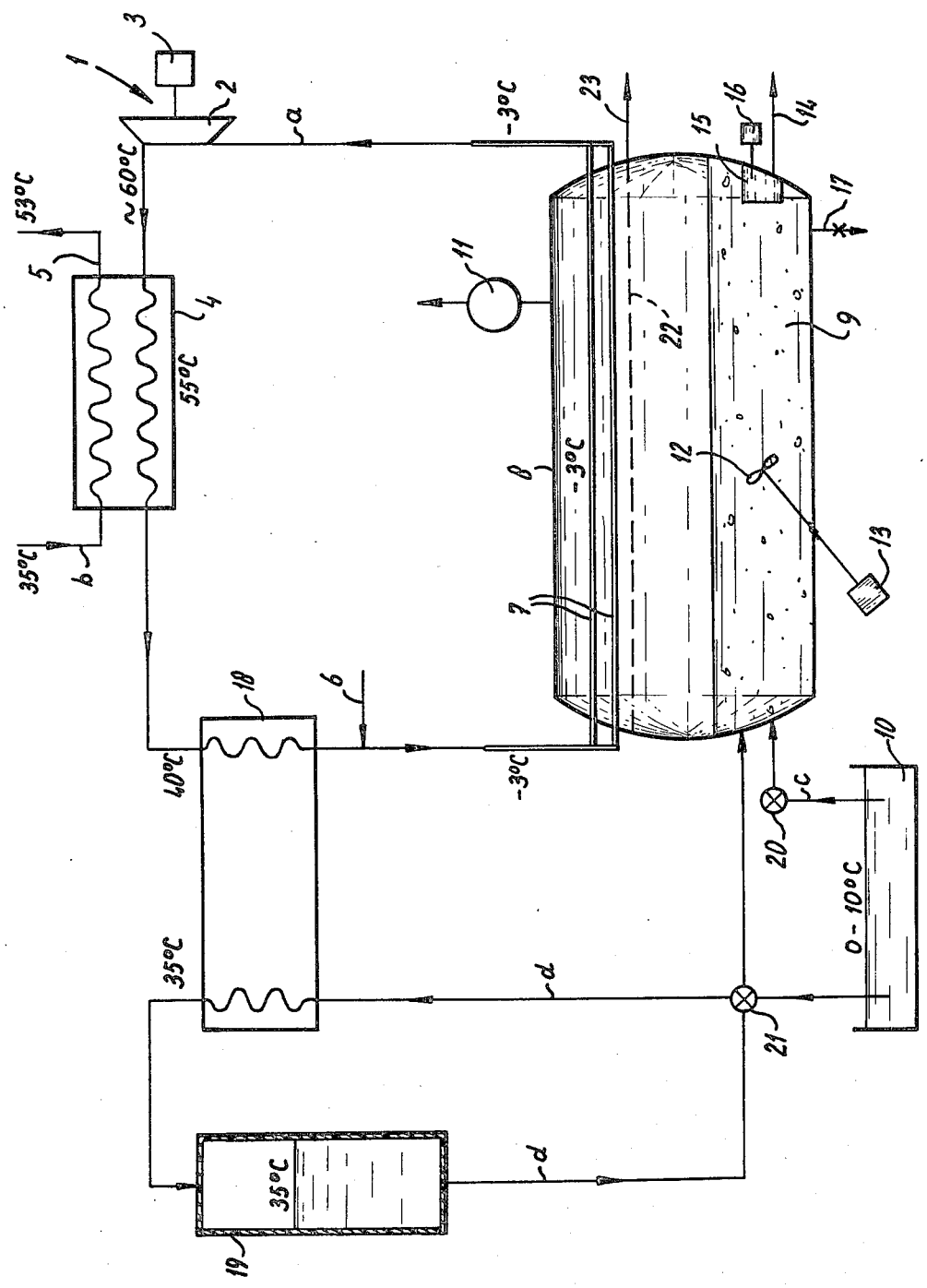

HEATPUMP

The invention relates to a heat pump of the compression- or absorption type, consisting of a closed circuit of a heat transport fluid provided with the usual means like a condenser for the delivery of heat at a higher temperature level, an evaporator for receiving heat from the environment at a lower temperature level and means adapted to circulate the transport fluid, whereby the evaporator is working at a temperature level below 0° C. and water, more specially between 0° C. and 10° C. forms the heat source like ground-, surface-, brackish- or sea water, such that formation of ice on the evaporator occurs.

A heat pump of the above described type, which makes use of the solidification heat of water, is known. To this group belongs in the first place the embodiment according to which the evaporator is immersed in the water which forms the heat source. During operation a solid layer of ice is built up on the evaporator, forming the well-known plate ice or block ice. Although the ice in itself still has a reasonable heat transmission coefficient, with this method only use is made of the solidification heat of the water. With increasing thickness of the layer of ice, the heat transmission resistance will also increase and the heat transfer capacity of the evaporator will drop. It will thus be necessary to remove the ice, for instance by means of a mechanical scaper or by means of temporarily reversing the heat pump cycle to free the cooling surface of the ice by melting it. Furthermore there may be necessary a milling apparatus in case the size of the ice pieces will have to be reduced to achieve an ice-water suspension which is well transportable through a pipeline. The total heat pump installation thus becomes complicated and expensive and requires much maintenance and generally does not work continuously. The scraping and milling apparatus require furthermore sturdy structures and consume energy.

In itself it is an advantage to use if possible the solidification heat of the water, since amongst others in doing so the water consumption can be small for a given heat pump capacity. For making use of the sensible heat of water there may be withdrawn 4.18 kJ per kg water and per °C. drop of temperature. Making use of the solidification heat of water to ice, however, 334 kJ become available with the formation of 1 Kg of ice.

Amongst others the advantages of the use of water over other heat sources, like for instance the ambient air, are an appreciable reduction of space requirement and of noise- and cold air nuisance at the location of the heat pump.

The invention aims to reduce as much as possible the disadvantages accompanying the formation of ice and to provide for an evaporator of a heat pump which does not require a mechanical ice scraper, nor reversing the heat pump cycle and which preferably produces a pumpable ice-water suspension without making use of a milling apparatus. In doing so the consumption of water as heat source remains small, just as was the case with the known evaporators of the type with plate- or block ice formation.

According to the invention the heat pump of the type described in the preamble is characterized in that the evaporator is placed in a vacuum vessel, in that the water providing the heat source is supplyable into said vacuum vessel and that the evaporator does not make direct contact with solid water, in that a vacuum pump is connected to the vessel, in that the vessel is able to withstand a sub-pressure lower than 0.006 ata (the triple point of water at a temperature of 0° C.), in that at least one pump for the extraction from the vessel of a water-ice crystal suspension is provided and that a stirring means or equivalent is provided in the vessel in order to keep the water-ice suspension in continuous movement and to promote the evaporation.

With the evaporator according to the invention not only the solidification heat of the water into ice on the evaporator is made use of, like described earlier, but the condensation heat of the water vapor on the evaporator as well, before the freezing takes place. The formation of ice on the evaporator takes thereby substantially place in the form of a desublimation process. Since the water forming the heat source is supplied at a temperature between approximately 0° C. and 10° C., the strong evaporation necessary for this kind of heat transport can only take place if a deep sub-pressure is maintained in the vessel, which is lower than the triple point of water. Under said conditions the water can "boil" and have a large vapor production and simultaneously form ice crystals in the water, during which solidification the heat necessary for the evaporation is produced.

For illustration purposes the following numerical example is given, in which for reasons of simplification the numerical values are slightly rounded off. Furthermore it is assumed that the water in the vessel has a temperture of 0° C. and that no sensible heat is released by the water anymore.

According to the known system with formation of plate ice or block ice on the evaporator, 334 kJ become available from the solidification heat of one kg of ice. Said 1 kg of ice is exclusively situated on and around the evaporator.

According to the invention, however, for the supply of 334 kJ to the evaporator which is situated above the water, only 0.118 kg of ice is deposited on the evaporator. Simultaneously in the bath a quantity of 0.882 kg of ice crystals is formed, giving in total again 1 kg of ice to supply said 334 kJ to the evaporator. Under the given conditions of vacuum the bath "boils", evaporating 0.118 kg of water for which per kg 2500 kJ are required, so that for said evaporation 295 kJ will have to be withdrawn from the water content. Since the solidification heat produces 334 kJ per kg, in the bath 295:334=0.882 kg of ice is formed. The water vapor flows by itself to the place where it condenses, being the condensor, on which 2500 kJ per kg of vapor is freed. The transported 0.118 kg of vapor transmits the earlier mentioned 295 kJ to the evaporator during its condensation. Subseqently said 0.118 kg of condensed water freezes under the formation of ice and thereby produces again 0.118×334 kJ=39 kJ, so that in total 295+39=334 kJ is transmitted to the evaporator. Thus the heat balance is fully closed again. The process on the evaporator, simplified above, in practice substantially will take place in the form of a desublimation process.

The essential difference with the known evaporator with formation of block ice or plate ice, is that the same quantity of heat is transmitted from the water to the evaporator, but with a formation of only 0.118 kg of ice on the evaporator instead of the 1 kg in case of the known state of art. The remaining ice formation has taken place in the bath of water and amounts to 0.882 kg, so that in total again 0.882+0.118=1 kg of ice is formed. It will be appreciated that, in case the evaporation would only take place on the surface of the water with a temperature of 0° C., there would be formed a thin layer of ice, which soon would bring the required process of heat transfer by evaporation to an end. It is therefore necessary that the water is mixed intensively and continuously or that, as is known in itself, the evaporation surface is further increased by having the water flow over plates or to have it sprayed through fountains, but it is preferred that the water never makes direct contact with the evaporator. The heat transport exclusively takes place through the vapor phase. It is known that when the water is mixed so intensely, the ice crystals remain of small dimensions and do not coagulate and that a well-pumpable water/ice crystal suspension is formed. For instance a suspension up to approximately 30% of volume of ice crystals has been found to be still pumpable without coagulation having to be feared. During the heat pump operation the extraction of the ice/water suspension may continuously take place as well as a corresponding supply of fresh water.

One of the important advantages attained by the invention is the fact that during regeneration only 0.118 kg of ice will have to be removed from the pipes of the evaporator. At the same time a pumpable water/ice crystal suspension is formed, which is replaced by fresh water between 0° C. and 10° C. in order to form the heat source during continued operation or during the next cycle. It is remarked that in the above only that part of the process is discussed, during which the water in the vessel is at a temperature of 0° C., under the required conditions of vacuum. In case water is supplied which is warmer than 0° C., like for instance groundwater at approximately 10° C., of course first the temperature of the water will fall by exclusively boiling, without formation of ice, from the supply temperature down to 0° C., but the heat quantity transmitted during this part of the process is only small since the sensible heat of the water is only 4.18 kJ per kg and per °C., compared to 334 kJ per kg in case of solidification and 2500 kJ per kg in case of evaporation or condensation.

After some time a layer of ice of such thickness has been formed on the evaporator, that the heat transmission is reduced too much. Then the heat pump is stopped in the usual way for a short period and the melting cycle begins. A common method to do so is in having the heat pump operate in the "reversed" mode, to have the ice melt from the evaporator. In case of a well-designed evaporator, more specially of the pipe-type, only a small quantity of heat will have to be supplied, and in fact only so little, that the ice is loosened from the evaporator pipes in order to fall down in the vessel. Therefore only a small fraction of the ice deposited is required to be melted indeed. Simultaneously the water/ice suspension is withdrawn from the vessel, after the fallen pieces of ice having been reduced in size by the milling apparatus if necessary.

According to a preferred embodiment it is possible to only withdraw the ice/water suspension from the vessel and to fill the vessel with water of about 25° C. up to for instance 35° C. In doing so the vapour pressure in the vessel rises to between approximately 0.03 and 0.05 ata and the ice formed on the evaporator is melted due to the heat exchange with the comparitively very intensive condensation of the water vapor on it. A reverse mode-operation of the heat pump is not necessary in this case. In a number of cases the heat pump may even continue its normal service.

The heating of the water which is used as heat source, from a temperature between 0° C. and 10° C. up to the above mentioned 25° C. to 35° C., may take place according to a preferred embodiment by incorporating an extra heat exchanger in the circuit of the heat transport fluid downstream of the condensor before the throttling means. In this case an auxiliary circuit is provided with water or with the same medium which forms the heat source, with an isolated tank, a pump and the necessary connections with valves between this circuit and the vacuum vessel, in order to accumulate the heat taken from said extra heat exchanger. With many heat pump installations the heat pumped up by the heat pump circuit is delivered into a heating circuit which enters the condensor at about 35° C. and leaves said condensor at approximately 53° C. The medium in the heat pump circuit is cooled in the condensor from approximately 60° C. down to approximately 40° C., condensing thereby at a temperature of about 55° C., being the condensation temperature of a very common cooling fluid like freon which may be used in the heat pump circuit. The liquid cooling fluid flow leaving the condensor at about 40° C. still contains so much heat at a useful temperature level, that with said heat the water at a temperature of between 0° C. and 10° C. used as heat source, may be preheated for the next charge of the vacuum vessel. The isolated water accumulator incorporated in said auxiliary circuit can thus be filled with water at approximately 35° C.

The ice formed in the lower part of the vessel is more or less pure, although impure water may have been used as heat source. Contaminated groundwater, salt water and brackish water are all applicable, as long as the installation is sufficiently corrosion resistant. By separating the ice from the water/ice suspension withdrawn from the vessel and by eventually washing it, purified and fresh water can be obtained; in a simple way it is possible as well to use the ice, stored in a season accumulator, for cooling purposes during for instance hot season. Distillated water can be produced as well in case the ice melted off from the evaporator, would separately be caught and withdrawn.

Furthermore it may be remarked that with the greater part of the known heat pump cycles the heat transport medium passes through the heat pump cycle such, that the cooling fluid enters the evaporator in liquid phase at a temperature of approximately −3° C. and subsequently is evaporated in it, so that the evaporator has an overall internal wall temperature of about −3° C. This is for instance the case when freon is used in the circuit. It is furthermore remarked that the above described installation will be more attractive the larger its capacity is. In consideration are for instance heat pump installations for the heat supply to residence blocks with one or several hundreds of apartments or whole districts, or buildings with a comparable heat demand. Application in the warehouse culture seems attractive as well.

Since the heat transfer in the vacuum vessel takes place with a heat flow density which, for a given rate of ice formation is eight times the density used in the known evaporators with the formation of plate- or block ice, the vacuum vessel may be kept within reasonable sizes, which is especially attractive for a vessel working under vacuum conditions. The required vacuum pump can be small and requires little power, because it only serves to withdraw the gases dissolved in each new water charge. The required vacuum is of an order for which vacuum pumps of simple type normally available in the trade are applicable.

Finally it may be pointed out that, in contradiction to for instance a heat pump with heat extraction from the ambient air, having the disadvantage of producing noise and cold air, the ice formed according to the invention thus forms in many cases a useful and valuable additional product.

From the accompanying drawing and its detailed description the invention will be explained in detail.

In the drawing the heat pump circuit and the heat pump are schematically depicted. Although the invention is also concerned with a heat pump of the absorption type, in the Figure and following description a heat pump of the compression type will be explained in detail by way of example. In the compresser 2 the circulated heat transport medium, like for instance freon, is compressed. The compresser is driven by a schematically indicated motor 3. The freon circuit is schematically indicated with a. The freon vapor compressed by the compressor 2 leaves the compressor at increased pressure and at a temperature of say about 60° C. or higher. At the prevailing pressure the condensation temperature of the freon is about 55° C. In the freon circuit follows subsequently the condenser 4, in which the freon vapour is cooled to its condensation temperature of about 55° C. and further releases heat during its condensation. All released heat is transferred into the heating circuit b, which for instance is the heating circuit of a district, a factory or so. The medium in the heating circuit b, for instance water, enters the condenser 4 with a temperature of approximately 35° C. and leaves the condenser at 5 with a temperature of approximately 53° C. The heat supply to the circuit b forms the main function of the heat pump. The freon condensed in the condensor 4 leaves the condenser with a temperature of approximately 40° C. at a pressure which is only a little lower than the outlet pressure from the compressor 2. The heat exchanger 18, incorporated in the circuit, will be discussed later. In the freon circuit a follows the throttle- or expansion valve 6, by which the pressure is reduced and at the same time the temperature falls to approximately −3° C., which is a temperature which under all circumstances is below the freezing point of water. Then the liquid freon is led through a group of evaporator tubes 7, which are only depicted schematically. Said evaporator tubes can have all possible practical known shapes, may also be plate-shaped and need not to extend horizontal. By heat input from the outside into the evaporator the liquid freon evaporates to form freon vapour and maintains its temperature of −3° C. In general the installation is designed such that the liquid is just completely evaporated when leaving the evaporator, so that the outlet temperature of the freon vapour is also approximately −3° C. This vapor is subsequently fed again to the suction side of the ccompressor 2, thus closing the circuit followed by the heat pump transport fluid. According to the invention the evaporator 7 is placed in the upper part of a vacuum vessel 8. In this vessel a vacuum pump 11 maintains a pressure below 0.006 ata, which is such that water 9 contained in the lower part of the vessel, finds itself at its triple point, provided the water has a temperature of 0° C. Because the evaporator has a temperature below 0° C., water vapor will desublimate on the evaporator tubes, transferring thereby both condensation heat and solidification heat to the freon liquid within the evaporator tubes. By continuously keeping the water contained in the vessel in circulation by means of a schematically depicted stirring means 12 driven by a motor 13, and by preferably further promoting the evaporation by means of non-illustrated fountains or so, on the one hand an intensive "boiling" of the water at the constant temperature of 0° C. will take place, whereby the developed water vapor condenses and freezes on the evaporator, whereas on the other hand the heat required for the "boiling" is withdrawn from the water of 0° C., resulting in ice crystals being formed in it. Thanks to the continuing intermixing an increasing number of small individual ice crystals are formed, which do not conglomerate, so that after some time a water/ice suspension is formed, which remains well pumpable up to an ice percentage of say 30% by volume. Thanks to the applied heat transport from the water bath to the evaporator 7 by means of the vapor phase, approximately 88% of the formed ice will stay in the bath and only about 12% will be present on the evaporator 7, in spite of the fact that all liberated heat during the forming of the ice is transferred to the freon during its evaporation in the evaporator 7. Through a discharge pipe 14 the water/ice suspension easily can be withdrawn and with the help of not illustrated means, treated further if so required. Thereby the ice may be utilized if wanted, for instance in a season-accumulator to provide for the cooling requirements in the warm season. Furthermore the ice formed, eventually after being washed, may provide a fresh water source, especially in case the water fed to the vacuum vessel 8 has not been fresh water, but for instance salt water, brackish water or groundwater.

It will be comprehensible that with growing thickness of the ice layer on the evaporator 7, the heat transfer coefficient will fall and that said ice will have to be removed periodically. This can take place according to a known method, according to which the heat pump cycle temporarily is reversed and the ice present on the outside of the evaporator is melted away since a warm freon flow is led through the evaporator. This known method, however, requires energy, but in case of an appropriate design of the outer surfaces of the evaporator, it is possible to loosen the ice by melting from said surfaces with only a small heat supply, so that the ice falls down in pieces into the water bath. In case said pieces might not be pumpable by the suspension pump in the discharge pipe 14, then a milling apparatus 15, driven by a motor 16, will first have to desintegrate the pieces down to a pumpable size.

As heat source for the heat pump water is used of a temperature between 0° C. and approximately 10° C., which may be surface water, groundwater, sea water, brackish water, etc. Schematically this water source is indicated with 10. Through a circuit c and a valve 20 periodically, or also continuously, water can be introduced from the water source 10 into the vessel 8. In case of continuous supply also the outlet of the water/ice suspension through the pipe 14 will have to take place continuously.

Since the evaporator 7 will have to be defrosted periodically, which takes place by melting the ice off, it may be useful to install under the evaporator a schematically indicated trough 22 to catch the melting water and the ice pieces, since here pure distilled water is concerned. This can separately be extracted through pipe 23 for further use.

A preferred method to perform the periodic defrosting of the evaporator 7 makes use of the remaining low temperature heat in the freon circuit a after it has left the condenser 4 with a temperature of about 40° C. In a heat exchanger 18, incorporated in the circuit a upstream of the throttle valve 6, it is possible to heat with said heat, an additional water circuit d up to about 35° C. This heated water may come from the same source 10 and is stored after its warming up in an insulated accumulator 19. From this accumulator it can be introduced periodically through valve 21 into the vacuum vessel 8. Preferably this is done when the supply valve 20 in the circuit c is closed and after the water/ice suspension has been completely discharged through the discharge pipe 14. The water entering the vacuum vessel 8 with a temperature of 35° C. will come to a very intensive vapor production, which is so strong that even with the freon circuit a remaining in normal operation, practically all ice is melted off from the evaporator 7 within a short period. Only a very thin ice layer of some tenth of a mm may remain on the exterior of the evaporator 7, which is no handicap, since the evaporator is designed to work with an on average much thicker ice layer. With this method of defrosting the heat supply takes place by means of the vapor attacking the ice on its outer surface so that the ice will have to be removed completely in the form of water. After this short defrosting cycle the bath 9 can be further filled up to its normal level with water from the source 10. During the defrosting cycle the introduced water of 35° C. is appreciably cooled down and the vacuum pump 11 has meanwhile restored the pressure in the vessel necessary to attain the triple point 0° C. During the following working cycle the accumulator 19 is gradually filled with water of 35° C.

I claim:

1. A system for extracting heat, more specifically from low temperature water, comprising: elements sized, designed and/or arranged for extracting heat from a source of water, at a temperature between approximately 0° C. and 10° C., such as groundwater, surface water, brackish water, or sea water, to serve as a heat source including a heat pump of the compression or absorption type, having a closed circuit containing a heat transport fluid; a condenser means for delivering heat to an outside medium at a higher temperature level; an evaporator means designed for receiving heat at a lower temperature level, in particular designed for receiving heat at a working temperature below 0° C.; means for circulating said fluid from said evaporator means to said condenser means for transporting heat therebetween; a vacuum vessel designed to withstand a sub-pressure below 0.006 ata (triple point of water at a temperature of 0° C); means for supplying said water, as a heat source, to said vacuum vessel; a vacuum pump connected to said vessel for evaporating water with the concomitant formation of ice; a stirring means sized and positioned in said vessel for promoting the evaporation of said water and for keeping the resultant water/ice crystal suspension in continuous movement; and at least one pump for the extraction of water/ice crystal suspension from said vessel, wherein said evaporator means are positioned in said vacuum vessel out of direct contact with said water/ice crystal suspension for absorbing heat from the evaporated water vapor, which is desublimating into ice on it, such that said heat transport fluid transports the absorbed heat to said condenser for extraction thereof.

2. A system as defined in claim 1, including means for removing desublimate from the evaporator by temporarily increasing the water vapor pressure inside said vessel, for causing intensive direct heat exchange between condensing water vapor and melting ice.

3. A system as defined in claim 2, wherein the means for desublimate removal comprises means for introducing heated water into said vessel.

4. A system as defined in claim 2, comprising a means for separately catching and withdrawing the ice and the distilled water melted from the evaporator.

5. A system as defined in claim 1, comprising an additional heat exchanger incorporated in the circuit of the heat transport fluid after the condenser and upstream of a throttling means, and further comprising an auxiliary circuit provided with water, for example the water serving as the heat source, for the accumulation of the heat released from said additional heat exchanger, said auxiliary circuit having an isolated accumulator vessel, a pump, and a connection incorporating a valve between said auxiliary circuit and said vacuum vessel.

6. A system as defined in claim 1, and further comprising an isolated store for season-accumulation of ice which is separated from the suspension.

7. A system as defined in claim 1, and further comprising a separating means for separating ice from the withdrawn suspension, and a washing means for said separated ice, for the production of fresh water.

* * * * *